United States Patent [19]
Lorbiecki

[11] Patent Number: 5,183,314
[45] Date of Patent: Feb. 2, 1993

[54] CONCEALED MECHANISM FOR DETACHABLY MOUNTING A VEHICLE SEAT

[75] Inventor: James R. Lorbiecki, Milwaukee, Wis.

[73] Assignee: Milsco Manufacturing Company, Milwaukee, Wis.

[21] Appl. No.: 793,580

[22] Filed: Nov. 18, 1991

[51] Int. Cl.⁵ .................................................. A47C 7/00
[52] U.S. Cl. ..................................... 297/440; 297/332; 297/DIG. 2; 248/503.1; 248/551; 296/65.1
[58] Field of Search ............... 297/15, 313, 325, 326, 297/331-336, 344, 42, 43, 329, 440, DIG. 2; 248/503.1, 395, 597, 598, 397, 398, 551; 296/65.1; 16/257, 258, 259, 254, 255, 225, 227, 223; 403/353

[56] References Cited

U.S. PATENT DOCUMENTS

| | | | |
|---|---|---|---|
| 4,183,580 | 11/1980 | Johansson | 297/15 X |
| 4,603,830 | 8/1986 | Franck | 248/598 X |
| 4,667,917 | 5/1987 | Takace . | |
| 4,671,570 | 6/1987 | Hockenberry et al. | 297/313 X |
| 4,759,580 | 7/1988 | Berklich, Jr. et al. | 248/503.1 X |
| 4,805,952 | 2/1989 | Coleman . | |
| 4,946,216 | 8/1990 | Demick | 248/503.1 X |
| 4,978,158 | 12/1990 | Kubo et al. | 297/15 X |

*Primary Examiner*—Peter R. Brown
*Assistant Examiner*—James M. Gardner
*Attorney, Agent, or Firm*—Nilles & Nilles

[57] ABSTRACT

A concealed quick attach and detach mechanism for releasably installing and automatically locking a seat against lateral movement on a vehicle of the type having spaced apart first and second cantilever supports which terminate in first and second laterally spaced free ends. The mechanism includes a seat pan having a housing that includes a concealed interior and an interior support axis and first and second spaced apart apertures in the pan housing aligned on the lateral support axis that open into the interior for slidably receiving the first and second supports therethrough, respectively, when the seat is installed on the vehicle. A deflectable first lock is provided in the seat pan interior in register with the support axis and laterally spaced from the first aperture. A biasing area is provided for normally maintaining the first lock in register with the support axis and for permitting the first lock to be deflected out of register with the support axis during attaching and detaching of the seat on the vehicle. A second lock is provided in the seat pan interior in register with the support axis and laterally spaced from the second aperture; and the first and second locks are spaced apart laterally from each other a distance that is substantially equal to the lateral spacing of the free ends of the cantilever supports on the vehicle on which the seat pan is to be mounted for automatic abutment against the free ends when the seat is installed to restrain the seat against lateral movement.

8 Claims, 3 Drawing Sheets

CONCEALED MECHANISM FOR DETACHABLY MOUNTING A VEHICLE SEAT

BACKGROUND OF THE INVENTION

1. Field of the Invention

This invention relates to a mechanism for permitting quick attachment and detachment of a seat on a vehicle without tools and more particularly to a totally concealed mechanism which will lock the seat against lateral movement.

2. Description of the Related Art

Many types of seat mounting mechanisms are known for detachably mounting a seat on a vehicle such as a tractor. It is also known to mount the seat on a support structure carried by the tractor that permits the seat to be pivoted to a tipped-up position against the tractor steering wheel to shed water in the event of rain.

Such seat mounting mechanisms permitting seat detachment are generally satisfactory if the seat is mounted inside a lockable vehicle. However, prior seat mounting mechanisms present certain long-standing problems when used on vehicles such as tractors having exposed seats and these problems have not been satisfactorily solved b prior designs. One long-standing problem is that of unauthorized removal of tractor seats for purposes of theft or simply for wanton vandalism. As is well known, tractors frequently are left outside and unattended, sometimes for long periods of time, and the seats thereof are commonly exposed to such theft and vandalism.

Prior seat attaching mechanisms use exposed attaching hardware requiring simple tools to detach or use hand operated attaching mechanisms such as disclosed in U.S. Pat. No. 4,667,917 for Seat Pedestal, issued May 26, 1987 to J. A. Takace; and U.S. Pat. No. 4,805,952 for Detachable Van Seat, issued Feb. 21, 1989 to J. Coleman. These patents are typical of prior art seat attaching designs. Such designs, while providing a capability to attach and detach the seat without tools, use expensive unconcealed attachment mechanisms, the operation of which can be readily understood. The consequence is that these seat attachment mechanisms can be easily operated by anyone desiring to remove the seat.

Another long-standing problem that exists with known designs is their mechanical complexity which requires the use of expensive hardware that is especially fabricated for the given seat attaching mechanism. Such prior seat attaching designs also require expensive, time-consuming assembly of components and the use of attaching means such as bolts, latches and the like which significantly increase the total cost of the seat.

What is needed is a strong, rugged seat attach and detach mechanism of simple design which affords the desired quick attachment and detachment of the seat by the operator without the need to use tools and which does so in a manner that totally conceals the attaching mechanism and its method of operation from those who are unfamiliar with the design. More specifically, the need is for a concealed attaching mechanism designed so that neither careful visual examination nor careful mechanical manipulation of the seat will disclose the operational steps required to detach the seat from the tractor and thereby minimize theft and wanton vandalism. The mechanism needs to be of utmost simplicity to reduce costs by eliminating the need for any separate fabricated seat attaching components such as locks, latches and the like while permitting the seat to be quickly and simply attached, locked against lateral movement and, when desired, detached in a non-obvious manner without the use of tools. These problems and needs have not been met by known seat attaching mechanisms.

SUMMARY OF THE INVENTION

In accord with the invention, a concealed quick attach and detach mechanism is provided for releasably installing and automatically locking a seat against lateral movement on a vehicle of the type having spaced apart first and second cantilever supports which terminate in first and second laterally spaced free ends. The quick attach and detach mechanism comprises a seat pan having a housing that includes an interior and first and second spaced apart apertures in the pan housing aligned on a lateral support axis and opening into the housing interior for slidably receiving the first and second supports therethrough, respectively, when the seat is installed on the vehicle. The mechanism also includes a deflectable first lock means in the seat pan interior in register with the support axis and laterally spaced from the first aperture. A biasing means is provided for normally maintaining the first lock means in register with the support axis and for permitting the first lock means to be deflected out of register with the support axis during attaching and detaching the seat on the vehicle. A second lock means is provided in the seat pan interior also in register with the support axis and laterally spaced from the second aperture. The first and second lock means are spaced apart laterally from each other a distance that is substantially equal to the lateral spacing of the free ends of the cantilever supports on the vehicle on which the seat pan is to be mounted for automatic abutment against the free ends when the seat is installed to restrain the seat against lateral movement. Preferably a cam means will be provided in the seat pan interior adjacent the deflectable first lock means and located to be contactable by the first cantilever support during attaching and detaching to deflect the first lock means out of register with the first support axis.

BRIEF DESCRIPTION OF THE DRAWINGS

Referring the drawings.

BRIEF DESCRIPTION OF THE PREFERRED EMBODIMENTS

Figure 1:
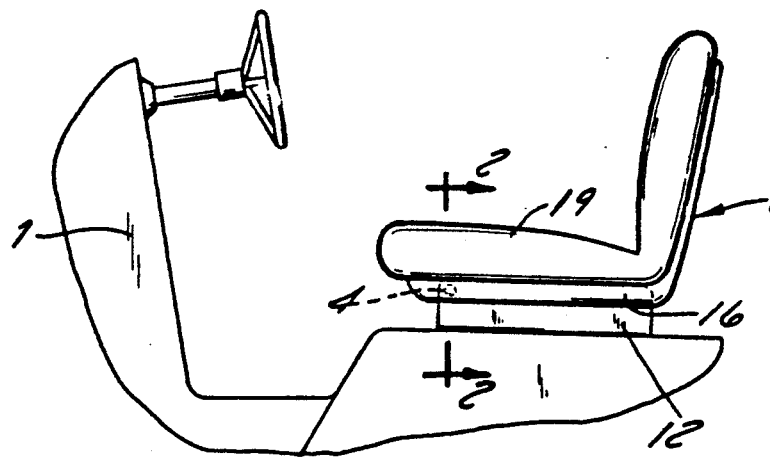
FIG. 1 is a partial side elevation of a tractor and an operator's seat thereon.

FIG. 1 shows a typical vehicle such as a tractor 1 on which a seat structure 2 is removably mounted and locked against lateral movement by a quick attach and detach mechanism shown in detail in FIGS. 2-5. The tractor 1 is of the type that has spaced apart first and second cantilever supports 3 and 4 in the form of cantilever pivot shafts 3 and 4 which terminate in first and second laterally spaced free ends 6 and 7. The free ends 6 and 7 may be chamfered to facilitate installation of the seat thereon. Preferably the pivot shafts 3 and 4 will comprise on continuous shaft but two separate cantilever support shafts would also provide a suitable seat support structure. The pivot shafts 3 and 4 are supported by first and second upstanding frame members 11 and 12 having laterally outward facing first and second abutment surfaces 13, 14.

The concealed seat attach and detach mechanism will now be described. The attach and detach mechanism preferably will be formed as an integral part of a seat pan 16 but could be fabricated as a separate unit and installed in the seat pan. The attach and detach mechanism if fabricated as an integral part of the seat pan 16 will not require the manufacture of any separate mounting components such as frame members, latches, fasteners and the like and, as will be explained, will not require assembly.

Figure 2:
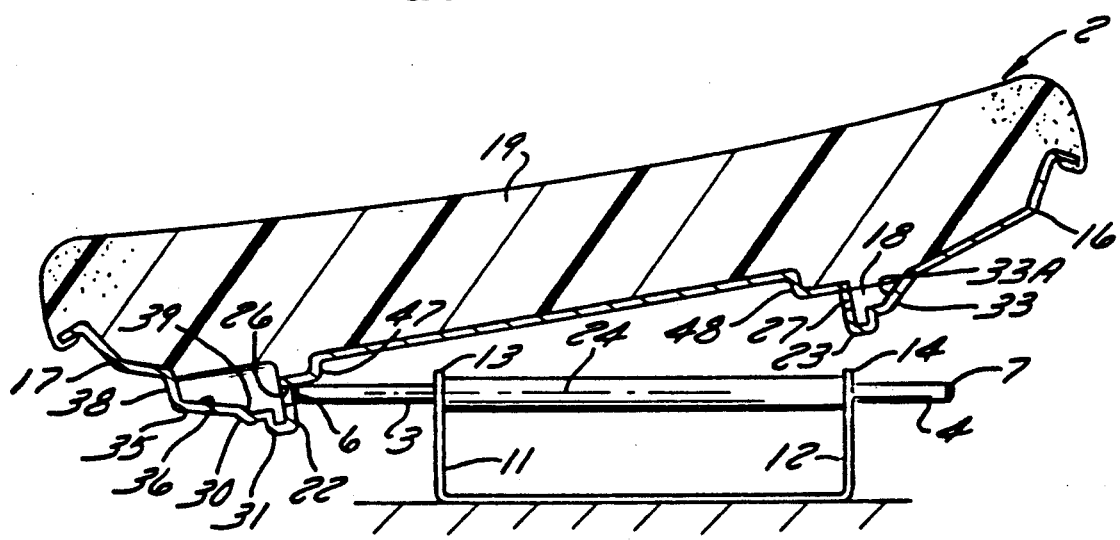
FIG. 2 is a sectional view taken along lines 2—2 of FIG. 1 showing the first position the seat is placed in to initiate installation thereof.
Figure 5:
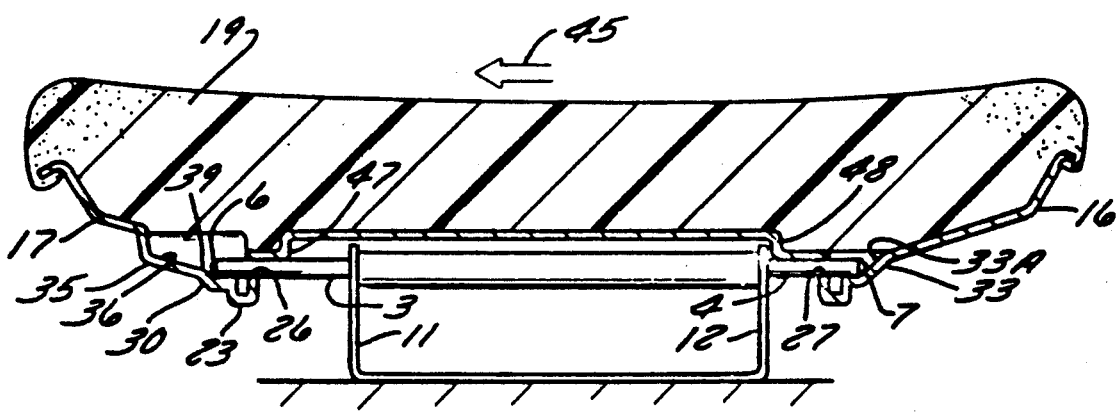
FIG. 5 is a sectional view taken along line 2—2 of FIG. 1 showing the seat locked in its finally installed position.
Figure 5A:
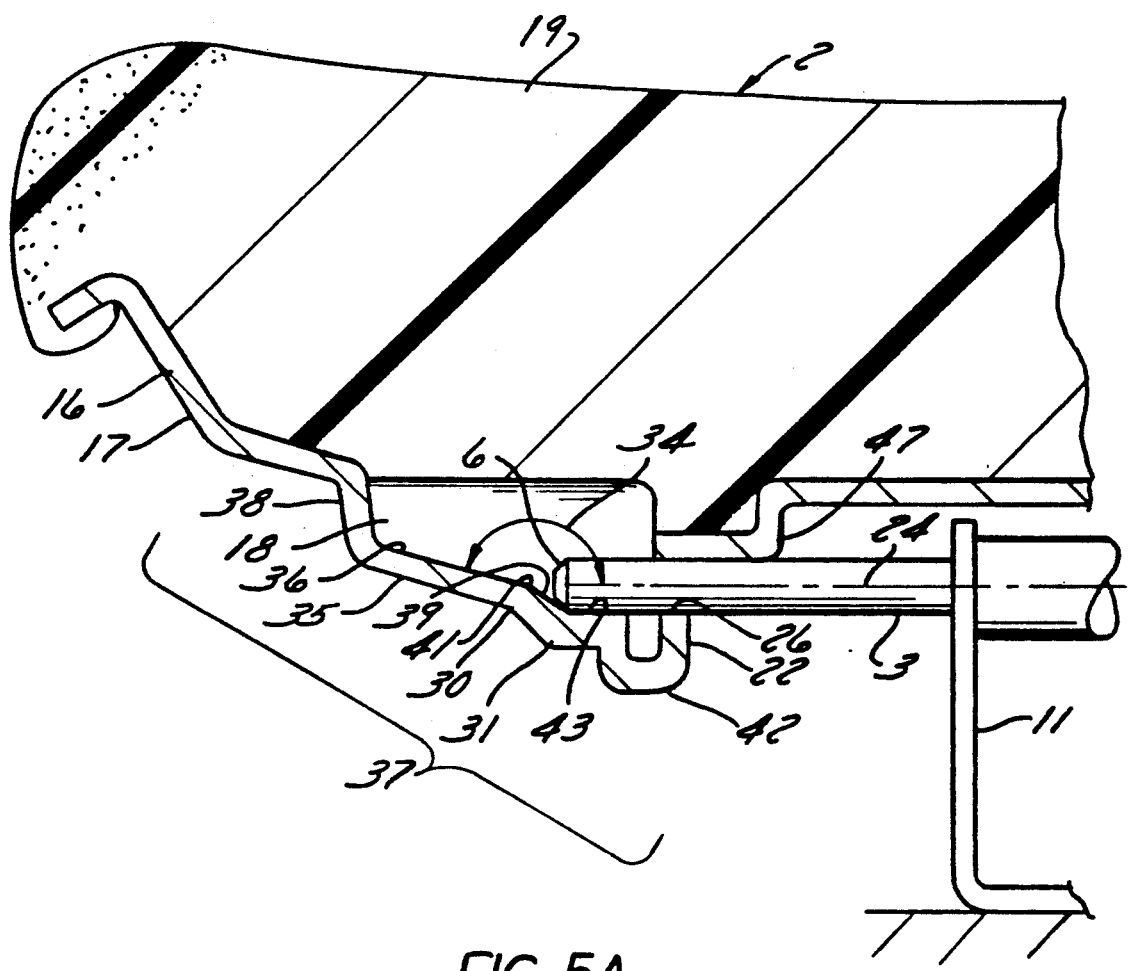
FIG. 5A is an enlarged showing of a part of the left side of FIG. 5.

With reference to FIGS. 2 and 5A, the concealed seat attach and detach mechanism comprises a seat pan having a housing 17 that defines a interior 18. The seat pan housing supports a cushion 19 on which the tractor operator sits with the cushion and housing concealing the interior spaces 18. The seat pan housing 17 may be stamped out of sheet metal material or preferably molded out of a suitable plastic material such as polystyrene, polypropylene, ABS or high density polyethylene—all materials which afford deflectability while retaining memory for their undeflected originally formed shape.

The housing has first and second laterally spaced wall portions 22, 23 and first and second apertures 26, 27 therein that are spaced apart and in alignment with each other on a lateral support axis 24. The wall portions 22, 23 extend at right angles to axis 24 and the apertures 26, 27 open into the interior 18 of the seat pan. A stop means 38 for the cantilever support shaft end 6 is provided in the seat pan interior 18 that is offset vertically and laterally spaced outward from a first lock means 30, the function of which will be more fully explained hereinafter.

A second lateral lock means 33 is also provided in the seat pan interior laterally spaced outward from the second aperture 27 and in register with the support axis 24. The second lock means 33 need not be deflectable and could be fabricated as a separate part and secured to the seat pan 17, if desired.

Referring particularly to FIG. 5A, the seat pan housing 17 has a deflectable wall area 37 which includes the first lock means 30, a biasing means 31, and a cam means 35, all of which will now be described. The deflectable wall area 37 is shown in FIG. 5A as lying in its as-formed, non-deflected position between the first aperture 26 and the stop means 38. The deflectable wall area 37 includes the deflectable first lock means 30 which is laterally spaced outward from the first aperture 26 and in facing register with the support axis 24. The deflectable first lock means 30 is preferably an integral part of the seat pan housing 17 but could be fabricated as a separate part and secured to the seat pan. More specifically, the first lock means 30 includes a wall having a first interior locking surface 39 in an inclined, spaced facing relation to first aperture 26 in register with axis 24; that is, wall 39 lies in a plane that intersects an extension of axis 24. In similar manner, the second interior locking means 33 has a second locking surface 33A in an inclined, spaced facing relation to second aperture 27 that is contactable by free end 7 of the second cantilever support 4 when the seat is installed.

The deflectable wall are 37 also includes the biasing means 31 to normally maintain the first lock means 30 in register with the axis 24 when the seat is in an installed position on the tractor. The biasing means 31 is preferably constituted by the inherent resiliency of the deflectable area and this resiliency permits the first lock means 30 to be deflected out of register with the support axis 24 during attaching and detaching of the seat on the tractor.

The deflectable wall area 37 further includes the cam means 35 in the seat pan interior 18 which is spaced outwardly adjacent the deflectable first lock means 30. The cam means 35 includes a wall having an interior cam surface 36 inclined at an obtuse angle 34 to intersect the first interior locking surface 39 and form a ridge 41. The cam surface 36 is contactable by the free end 6 of first cantilever support shaft 3 during attaching and detaching to assist in maintaining the first lock means 30 in a deflected position out of register with the first support axis 24, as will be more fully explained hereinafter.

In addition, the deflectable wall area 37 includes a portion 42, U-shaped in section, underlying the first aperture 26 and a support shaft rest area 43 between the U-shaped portion and the first lock means 30.

The seat pan 16 includes first and second indexing shoulders 47, 48 formed therein to assist in aligning the seat pan during installation.

Figure 3:
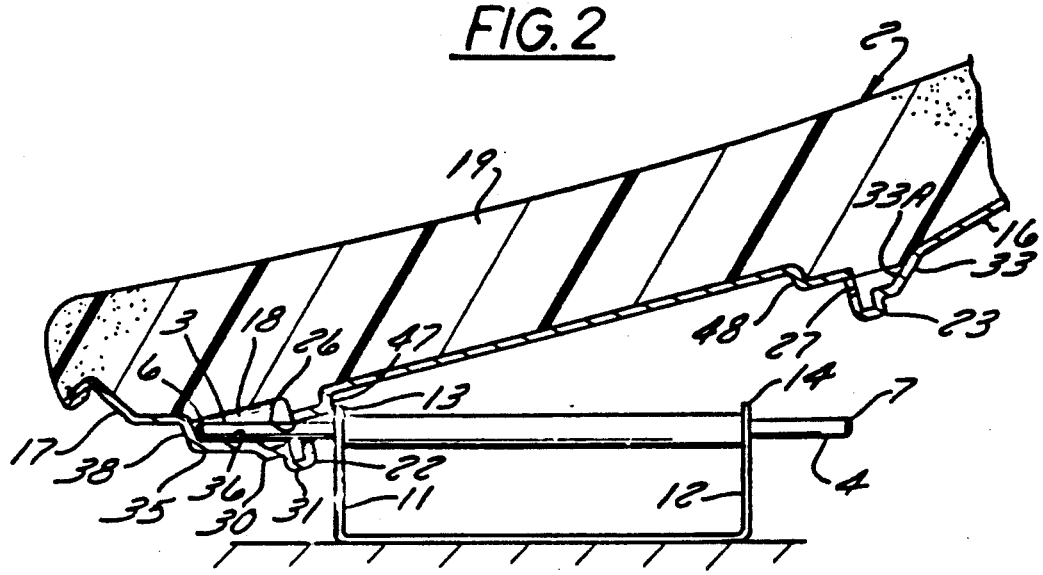
FIG. 3 is a sectional view taken along line 2—2 of FIG. 1 showing the second position the seat is placed in during installation.
Figure 4:
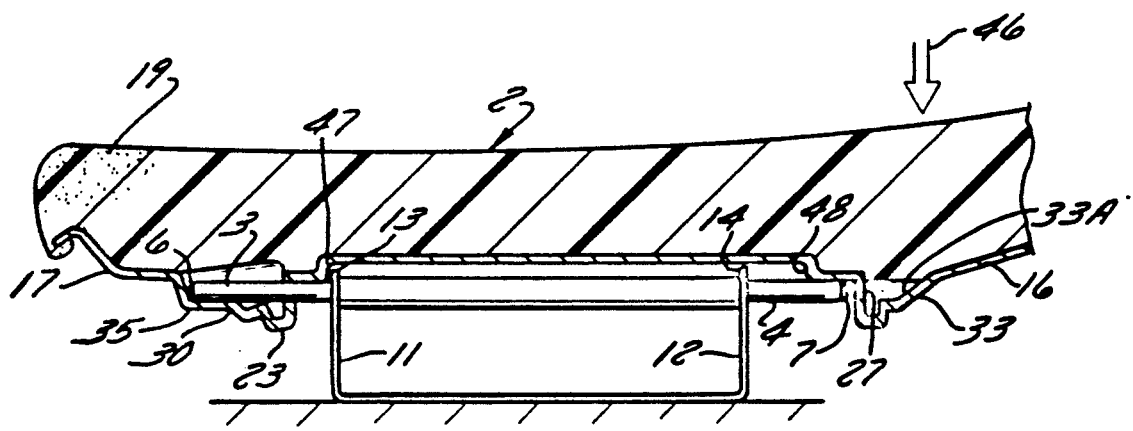
FIG. 4 is a sectional view taken along line 2—2 of FIG. 1 showing the third position the seat is placed in during installation.

The seat 2 is attached to the tractor in the following manner. Referring to FIG. 2, the seat pan 16 is canted relative to axis 24 of first cantilever support shaft 3 and the free end 6 of first support shaft 3 is aligned and started through first aperture 26 in the seat cushion pan 16. Referring to FIG. 3, the pan 16 is then slid over the free end 6 of shaft 3 until the shaft end abuts against internal stop 38. Index shoulder 47 is now positioned to clear abutment 13. Referring to FIG. 4, the raised right side of the pan 16 is no forced down in the direction of arrow 46 to align second aperture 27 with the free end 7 of second support shaft 4 and this deflects the internal first lock means 30 of the pan 16 downward. Referring to FIG. 5, the seat pan 16 is then slid back along first support shaft 3 from the position shown in FIG. 4 in the direction of arrow 45 causing the free end 7 of shaft 4 to enter second aperture 27. As this sliding movement continues, the free end 6 of support shaft 3 withdraws along cam surface 36 until free end 6 clears ridge 41 and index shoulder 48 contacts abutment 14. The first lock means 30 on the seat pan 16 is now no longer retained by cam surface 36 in a deflected position and thus is free to flex back upward after free end 6 clears contact with ridge 41. The pan 16 is thus allowed to return to its normal shape capturing and automatically locking the free ends 6 and 7 between concealed internal first locking surface 39 of first lock means 30 and internal second locking surface 33A of second lock means 33 to prevent lateral side-to-side motion of the installed seat. The index shoulders 47, 48 are not essential components of the seat attaching mechanism.

The above steps are reversed to remove the seat without use of tools. To start seat removal, it is preferable but not absolutely essential to push vertically downward on that portion of the seat cushion 19 located above the deflectable wall area 37. This push will initiate deflection of the deflectable wall area 37. The initial deflection of area 37 will make it easier for free end 6 of shaft 3 to slide up along first locking surface 39 and over ridge 41 as the seat is moved laterally in a direction opposite to arrow 45.

Figure 6:
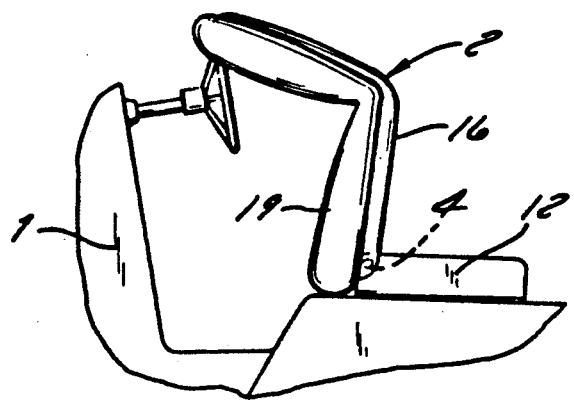
FIG. 6 is a partial side elevational view similar to FIG. 1 showing the seat pivoted forward to a rain shedding position.

As the seat cushion non-removably covers the entire inside of the pan 16, the structure of the seat attach and detach mechanism is completely concealed from view. If someone attempts to manually manipulate the seat 2 in a lateral direction, the first and second stops 30, 33 will contact free ends 6 and 7 and prevent any movement thereof. Pivoting the seat to the tilted position shown in FIG. 6 will not give any clue as to how the seat may be detached as the stops 30, 33 remain operative through all pivoting movement. Therefore visual inspection and mechanical manipulation will not reveal that the only way to detach the seat is to apply significant force in a lateral direction opposite to arrow 45 of a magnitude great enough to overcome the inherent bias of the deflectable wall area 37, thus allowing the seat pan 16 to be moved laterally to the right in FIG. 5 until free end 7 is withdrawn from second aperture 27. The seat pan housing 17 is designed so that the force required to deflect the area 37 is considerable, making it unlikely that anyone will accidentally apply enough force to cause deflection and even if one does so, there is no reason to assume that such force would be accompanied by the subsequently required opposite alternate lateral movements necessary to complete removal of the seat.

Further, this attach and detach mechanism can be manufactured with absolutely no increase in the cost of the seat as no attachment components are required. The cost of forming the seat pan 16 with the requisite attach and detach mechanism therein is the same as the cost of forming a seat pan without such mechanism. Further, there are no assembly costs as all components of the attach/detach mechanism can be integrally formed within the seat pan 16.

What is claimed is:

1. A concealed quick attach and detach mechanism for releasably installing and automatically locking a seat against lateral movement on a vehicle of the type having spaced apart first and second cantilever supports which terminate in first and second laterally spaced free ends comprising
   a seat pan having:
   a housing that includes a concealed interior and a lateral support axis;
   first and second spaced apart apertures in said pan housing aligned on said lateral support axis and opening into said interior for axially slidably receiving said first and second supports therethrough, respectively, when said seat is installed on the vehicle;
   a deflectable first lock means in said seat pan interior in register with said support axis and laterally spaced from said first aperture;
   a biasing means in said housing for normally maintaining said first lock means in said register and for permitting said first lock means to be deflected out of register with said support axis during attaching and detaching of said seat on the vehicle;
   a second lock means in said seat pan interior in register with said support axis and laterally spaced from said second aperture; and
   said first and second lock means being spaced apart laterally from each other a distance that is substantially equal to said lateral spacing of said free ends of the cantilever supports on the vehicle on which said seat pan is to be mounted for automatic abutment against said free ends when the seat is installed to restrain the seat against lateral movement.

2. The concealed quick attach and detach mechanism according to claim 1 further comprising a cam means in said seat pan interior adjacent said deflectable first lock means and located to be contactable by said first cantilever support during attaching and detaching to assist in deflecting said first lock means out of register with said first support axis.

3. The concealed quick attach and detach mechanism according to claim 2 wherein said cam means includes a cam surface adjacent said first lock means that is inclined at an obtuse angle to lie across said first support plane.

4. The concealed quick attach and detach mechanism according to claim 1 wherein:
   a stop means is provided in said seat pan interior offset from said first support axis and laterally spaced from said first lock means;
   said seat pan has a deflectable wall area between said first aperture and said stop means, said deflectable wall area normally lying in a non-deflected position across said first support plane and a memory for returning to said non-deflected position after deflection;
   said first lock means includes a first interior locking surface on said deflectable wall portion facing said first aperture for contact with said first free end of the first cantilever support when installed on the vehicle;
   said biasing means is constituted by said deflectable wall means; and
   said second locking means includes a second interior locking surface facing said second aperture in laterally spaced relation thereto.

5. The concealed quick attach and detach mechanism according to claim 4 wherein said deflectable wall area has an interior cam surface between said first lock means and said stop means that is inclined to intersect and lie across said first support plane at an obtuse angle thereto.

6. The concealed quick attach and detach mechanism according to claim 5 wherein said cam surface on said deflectable wall portion interfaces with said first locking surface at an obtuse angle therewith forming a ridge at said interface between said cam surface and said first locking surface that is contactable by said first cantilever support during attachment to assist in causing deflection of said deflectable wall area.

7. The concealed quick attach and detach mechanism according to claim 1 wherein said seat pan housing is pivotable about said support axis.

8. A seat adapted to be detachably mounted on a vehicle comprising:
   a seat housing having a concealed interior and a lateral support axis;

first and second laterally spaced apart apertures in said seat housing aligned on said lateral support axis and opening into said interior;

a deflectable first lock means in said seat housing interior in register with said support axis and laterally spaced from said first aperture;

a biasing means in the interior of said housing for normally maintaining said first lock means in said register and for permitting said first lock means to be deflected out of register with said support axis during attaching and detaching of said seat on said vehicle; and a second lock means in said seat housing interior in register with said support axis and laterally spaced from said second aperture.

* * * * *